(12) United States Patent
Desfriches et al.

(10) Patent No.: US 8,442,734 B2
(45) Date of Patent: May 14, 2013

(54) VEHICLE ASSIST METHOD

(75) Inventors: Christophe Desfriches, Pacy-sur-eure (FR); Alessandro Monti, La-Garenne-colombes (FR); Richard Pothin, Jouars-Pontchartrain (FR)

(73) Assignee: Renault S.A.S., Boulogne-Billancourt (FR)

( * ) Notice: Subject to any disclaimer, the term of this patent is extended or adjusted under 35 U.S.C. 154(b) by 417 days.

(21) Appl. No.: 12/667,924

(22) PCT Filed: Jul. 4, 2008

(86) PCT No.: PCT/FR2008/051253
§ 371 (c)(1),
(2), (4) Date: Apr. 9, 2010

(87) PCT Pub. No.: WO2009/010675
PCT Pub. Date: Jan. 22, 2009

(65) Prior Publication Data
US 2010/0185374 A1  Jul. 22, 2010

(30) Foreign Application Priority Data

Jul. 6, 2007 (FR) ...................................... 07 56318

(51) Int. Cl.
*G06F 7/00* (2006.01)
*G06F 17/00* (2006.01)
*G06F 19/00* (2011.01)

(52) U.S. Cl.
USPC .............................................. 701/68; 701/67

(58) Field of Classification Search .................... 701/67, 701/68; 192/70.251, 70.252, 70.26, 111.1, 192/111.11–111.19, 111.2, 111.7
See application file for complete search history.

(56) References Cited

U.S. PATENT DOCUMENTS

| | | | |
|---|---|---|---|
| 6,554,742 B2* | 4/2003 | Milender et al. | 477/155 |
| 6,575,283 B2* | 6/2003 | Drexl et al. | 192/85.51 |
| 2002/0134637 A1* | 9/2002 | Salecker et al. | 192/54.1 |
| 2004/0064232 A1* | 4/2004 | Eich et al. | 701/68 |
| 2004/0157704 A1* | 8/2004 | Stork et al. | 477/166 |

FOREIGN PATENT DOCUMENTS

| | | |
|---|---|---|
| DE | 101 38 203 | 4/2003 |
| EP | 1 491 787 | 12/2004 |
| FR | 2 854 848 | 11/2004 |

* cited by examiner

*Primary Examiner* — Jeffrey Shapiro
(74) *Attorney, Agent, or Firm* — Oblon, Spivak, McClelland, Maier & Neustadt, L.L.P.

(57) ABSTRACT

A control assist method for a vehicle including a power train connected to drive wheels by a clutch. The method updates a clutch curve which connects a position of a clutch pedal and a maximum torque that can be transmitted by the corresponding clutch, as a function of reliability thereof, the reliability being lower when the vehicle is first used and increasing with use of the vehicle.

6 Claims, 2 Drawing Sheets

VEHICLE ASSIST METHOD

BACKGROUND

The present invention relates to a power-assistance method for control for a vehicle having a manual or automatic gearbox, employing an algorithm for learning the clutch characteristic curve.

The invention relates in particular to power-assistance devices and methods for uphill maneuvers, but it may also be applied to estimation of the wear of a vehicle clutch or even to control of an electronic trajectory control system (better known under the name Electronic Traction Control, ETC) of a 4×4 vehicle.

On certain vehicles, the automobile manufacturers are offering a power-assisted parking brake.

By reason of its relatively high cost compared with the traditional parking brake solution, this power-assisted parking brake must provide performance that adds value for the customer.

To add value to this system, the manufacturers have therefore decided to associate therewith a power-assistance function for uphill maneuvers and especially power assistance for uphill starting (or pulling away), wherein the principle is to release the brakes on the non-driving wheels as soon as the torque transmitted by the engine to the driving wheels is sufficient to compensate for the inclination effect of the slope.

Such devices are already known.

In this regard, document GB 2376990 proposes a control module for a power-assisted parking brake device for a motor vehicle provided with a manual gearbox, which releases the force applied to the parking brake when it receives signals indicating to it, on the one hand, a positive displacement of the accelerator pedal and, on the other hand, that the position of the clutch pedal has reached its bite point. The instant at which the device releases the brake also depends on the clutch-pedal depression velocity, on the gear ratio engaged and on the slope on which the vehicle user is located.

This device has the disadvantage of being sensitive to the noise of sensors, such as the inclination sensor. Furthermore, it takes only the bite point on the clutch characteristic curve into account. Thus it does not permit optimal pulling away on a steep slope.

Finally, another disadvantage of this method is that it is based on calculation, from an estimate of the engine torque, of the torque transmitted by the clutch corresponding to the bite point. Thus it does not take into account the aging of the clutch, and it is sensitive to active consuming loads, such as the air-conditioning, the alternator or any other device consuming part of the energy supplied by the engine.

Document FR 2828450 in turn proposes a power-assistance method for uphill starting using the characteristics of the vehicle clutch by means of an algorithm for estimating the torque transmitted to this clutch, in order to control brake release more precisely during pulling away.

This estimate is made by plotting a clutch characteristic curve, which gives the position and the maximum torque that can be transmitted by the corresponding clutch. However, it is very sensitive to the initialization of the said curve as well as to sensor noise. Furthermore, updating of the curve is slow and unsuitable for its degree of reliability.

BRIEF SUMMARY

One objective of the invention is to propose a power-assistance method, especially for uphill maneuvers, which is insensitive to the active consuming loads.

Another objective of the invention is to propose a power-assistance method, especially for uphill maneuvers, which is based on an estimate of the clutch characteristic curve and which is not very sensitive to initialization of the said clutch characteristic curve.

For that purpose, the invention proposes a power-assistance method, characterized in that it updates a clutch characteristic curve, the said curve linking the position of the clutch pedal and a maximum torque that can be transmitted by the corresponding clutch, as a function of its reliability, its reliability being less at the start of use of the vehicle and increasing with use of the said vehicle.

Certain preferred but non-limitative aspects of the method according to the invention are the following:
 at least one of the following parameters is varied as a function of the reliability of the curve:
  a number of upshifts and/or downshifts taken into account for each torque interval,
  a threshold deviation,
  a slipping threshold, or
  a reliability factor,
 the number of upshifts and/or downshifts, the threshold deviation, the slipping threshold and/or the reliability factor taken into account for the torque interval are parameterized as a function of each torque interval,
 the clutch characteristic curve is updated in real time throughout the life of the vehicle,
 it employs a power-assistance device according to the invention.

Finally, according to a last aspect of the invention, there is proposed the employment of a power-assistance method according to the invention in a vehicle, in order to aid a user of the vehicle to accomplish uphill maneuvers, to estimate the wear of the vehicle clutch and/or to control an electronic traction control system of a 4×4 vehicle.

BRIEF DESCRIPTION OF THE DRAWINGS

Other characteristics, objectives and advantages of the present invention will become apparent upon reading the detailed description hereinafter with reference to the attached drawings, provided by way of non-limitative examples and wherein.

DETAILED DESCRIPTION

Figure 1:
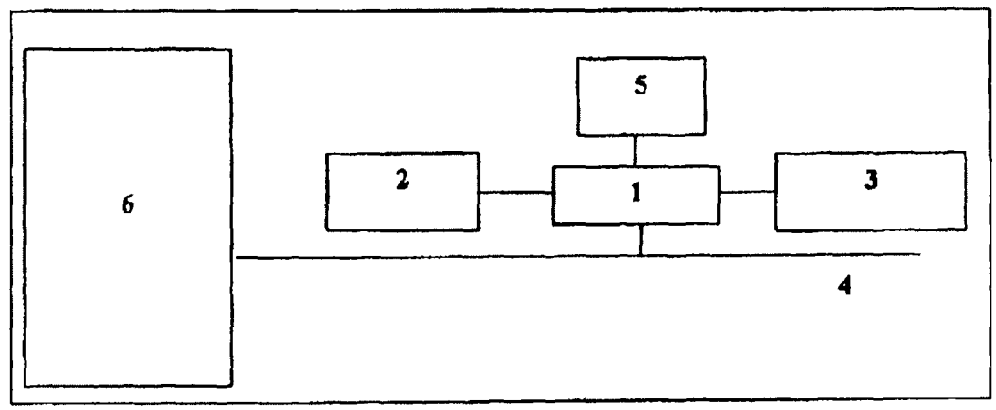
FIG. 1 presents the functional architecture of a vehicle equipped with the device according to the invention.

A vehicle equipped with a power-assistance device for uphill starting according to the invention comprises a motive power assembly, a power-assisted parking brake 5, a bus 4 on which the signals originating from the rest of the vehicle 6 travel, and a computer for control of the motive power assembly.

Bus 4 is preferably a bus based on the CAN™ standard (Control Area Network, meaning control zone network).

The motive power assembly is composed of a heat engine coupled to the driving wheels by a transmission device provided with a gearbox and a clutch, controlled by the user or a computer depending on the type of gearbox.

Alternatively, the motive power assembly may be provided with one or more electrical machines, with or without heat engine.

The power-assistance device for uphill starting cooperates with a computer 1 for control of power-assisted parking brake 5, which computer is also connected to bus 4.

Computer 1 is equipped in known manner with a means for producing orders to apply and release power-assisted parking brake 5, the said orders 5 being generated on a line for connection to power-assisted parking brake 5 itself. If necessary, computer 1 is also equipped with a means for transmitting to bus 4 items of information on the state of power-assisted parking brake 5.

Computer 1 for control of power-assisted parking brake 5 is connected by an appropriate line to an inclination sensor 2.

When the vehicle is stopped on a slope, inclination sensor 2 delivers a signal representative of the inclination of the slope on which the vehicle is stopped.

When computer 1 for control of power-assisted parking brake 5 produces an order to apply, the movable parts of the brakes cause the disks to be clamped in such a way that power-assisted parking brake 5 is applied.

Inversely, when computer 1 for control of power-assisted parking brake 5 produces an order to release power-assisted parking brake 5, the movable parts of the brakes are released.

Furthermore, in the brake-release situation (regardless of the inclination of the slope), the motive power assembly of the vehicle produces a torque, which is or is not transmitted to the wheels, depending on whether or not the clutch is active, and in a proportion that depends on the clutch position.

Thus the device of the invention determines a condition for release of power-assisted parking brake 5, as a function in particular of the inclination of the slope and of the estimate of the torque ECT transmitted to the clutch. This condition is determined in such a way that the vehicle is capable of pulling away as soon as a certain threshold, at which the slope effect is balanced by the engine torque, is exceeded.

In order to pull away, a vehicle parked on a slope must overcome the slope effect due to gravitational force.

This effect is a function of the inclination of the slope and of the mass of the vehicle, and is equal to $$m \cdot g \cdot \sin(\theta_{slope}) \quad \text{(EQUATION 1)}$$

where
m is the mass of the vehicle,
g is gravity,
$\theta_{slope}$ is the inclination of the slope.

The minimum torque $C_{T\_threshold}$ that must be transmitted to the clutch via the kinematic chain of the wheel in order to permit the vehicle to pull away (or in other words to start on the slope) must be at least equal to $$C_{T\_threshold} = ECT(\theta_{clutch\_threshold}) = m \cdot g \cdot \sin(\theta_{slope}) \cdot r(b) \cdot \rho_{wheels} \quad \text{(EQUATION 2)}$$

where
r(b) is the engaged gearbox ratio corresponding to position b of the gearshift lever,
$ECT(\theta_{clutch\_threshold})$ is the torque transmitted by the clutch when the pedal is depressed to the position $\theta_{clutch\_threshold}$,
$\rho_{wheels}$ is the radius under load of the vehicle wheels.

The torque $C_{T\_threshold}$ is in fact the pull-away threshold torque.

The strategy proposed by the invention is based on improving the algorithm presented by the application FR 2828450, which proposes a device making it possible to estimate the clutch characteristic curve (which, as we recall, links the position of the clutch pedal to the maximum torque applied by the clutch), in such a way that the device is less sensitive to wear and aging of the clutch as well as to the active consuming loads than are the methods based on calculation thereof. This algorithm is illustrated in the attached FIG. 2 and will not be described further. The associated method commands the release of the power-assisted parking brake when the torque ECT transmitted to the clutch is greater than the pull-away torque $C_{T\_threshold}$ given by equation 2.

The difficulty consists in estimating the torque transmitted to the clutch as precisely as possible.

Figure 2:
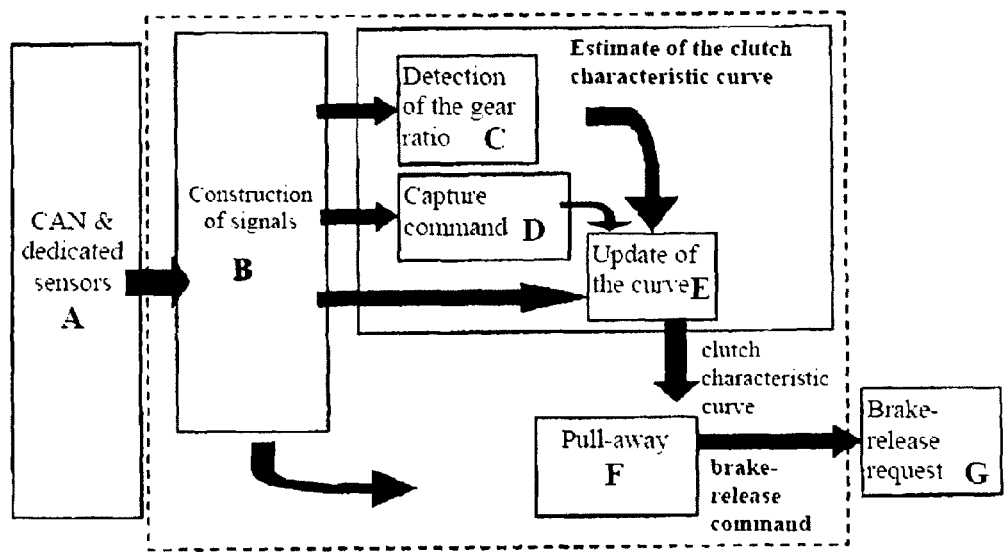
FIG. 2 illustrates the functioning principle of the automatic system that estimates the torque transmitted to the wheels of a vehicle employed in the invention.

For that purpose, the algorithm and the method proposed by our invention improve blocks B and E of FIG. 2, namely the blocks for constructing the input signals and for updating the clutch characteristic curve.

On the clutch characteristic curve, the bite point is defined as corresponding to the pedal position for which the clutch begins to transmit a torque. This minimum torque may be, for example, on the order of 3 N.m.

The bite point therefore corresponds to a clutch-pedal position at which the clutch is in a slipping phase.

This characteristic evolves with time, as a function of the wear of the lining of the friction plate of the clutch and of the flywheel of the vehicle, of the change, due to repeated use, in stiffness of the springs that apply pressure to the clutch, etc.

The torque transmitted by the clutch is therefore determined on the basis of a priori knowledge of the clutch characteristic curve. For that purpose, the clutch-pedal position at which the pull-away threshold torque $C_{T\_threshold}$ is transmitted must be determined by solving equation 2. From this there is then deduced the position $\theta_{clutch\_threshold}$ that the clutch pedal must assume in order to achieve a quality uphill start.

Since the clutch characteristic curve is sensitive to wear and aging of the clutch, it is necessary to update it throughout the entire life of the vehicle.

In the description hereinafter and in the attached figures we will use the following notations to identify the mathematical variables involved in the invention:

$C_{m\_CME}$ is the effective mean torque delivered by the engine, estimated by the engine computer, $\omega_m$ is the angular velocity of rotation of the engine, $\omega_R$ is the angular velocity of rotation of the front wheels, v is the longitudinal speed of the vehicle, $\theta_{clutch}$ is the position of the clutch pedal, $\theta_{acc}$ is the position of the accelerator pedal, $\theta_{slope}$ is the inclination of the vehicle, RE is the engaged gear ratio. RE=0 at the neutral point, and RE=1 regardless of the engaged gear, except for reverse, in which case RE=−1, $\dot{x}$ is the derivative of the variable x with respect to time.

According to the invention, the clutch characteristic curve is estimated on the basis of points acquired during phases of changing of the gear ratio of the vehicle, preferably in the course of downshifts. In fact, during downshifts, the engine computer of the vehicle delivers a better estimate of the engine torque $C_{m\_CME}$, since it must take into account only the effect due to retraction of the pistons when they are in the air-intake phase, while during upshifts, the engine computer must take into account the combustion temperature of the mixture, the amount of fuel actually injected, etc., thus making the estimate of the engine torque $C_{m\_CME}$ much more complex and less certain.

Improvement of the Block for Constructing Signals Delivered by the Sensors of the Vehicle:

The equations of the dynamic on which the method of the invention is based are as follows:

$$m \dot{v} = F_x - F_{res}$$

$$J_R \cdot \dot{\omega}_R = C_R(\theta_{clutch}, \omega_m - \omega_R) - \rho_{wheels} \cdot F_x$$

$$J_m \cdot \dot{\omega}_m = C_{m\_CME}(\omega_m, \theta_{acc}) - r(b) \cdot C_R(\theta_{clutch}, \omega_m - \omega_R) \quad \text{EQUATION 3}$$

Thus:

$$F_x = m \cdot \dot{v} + F_{res}$$

$$C_R(\theta_{clutch}, \omega_m - \omega_R) = J_R \cdot \dot{\omega}_R - \rho_{wheels} \cdot F_x$$

$$C_{m\_CME}(\omega_m, \theta_{acc}) = J_m \cdot \dot{\omega}_m + r(b) \cdot C_R(\theta_{clutch}, \omega_m - \omega_R) \quad \text{EQUATION 4}$$

where
$r(b) \cdot C_R(\theta_{slope}, \omega_m - \omega_R)$ is the torque transmitted by the clutch in the position $\theta_{clutch}$, which will be denoted $ECT(\theta_{clutch})$ $F_x$ is the longitudinal component of the force of contact between the vehicle wheel and the ground, $F_{res}$ is the longitudinal component of the resistance to movement of the vehicle.

When slipping is sufficient, it is possible to use equation 4 to estimate the clutch characteristic curve. The following equations are then obtained:

$$ECT(\theta_{clutch}) = C_{m\_CME} - J_m \dot{\omega}_m$$

$$\omega_R - r(b) \cdot \omega_m > \Delta\omega_{threshold} \quad \text{EQUATION 5}$$

The second equation is a condition on slipping. It indicates that the difference between the angular velocity $\omega_R$ of the wheels and the angular velocity $r(b) \cdot \omega_m$ of the clutch must be greater than a threshold angular velocity $\Delta\omega_{threshold}$ in order to guarantee that the torque transmitted by the clutch is the maximal torque that can be transmitted by the clutch at the position $\theta_{clutch}$ under consideration.

To estimate the clutch characteristic curve, as can be shown by equation 5, it is necessary that the variables $C_{m\_CME}$, $\theta_{clutch}$, $\omega_m$, $\omega_R$ and $\dot{\omega}_m$ be in phase.

Filtering and/or differentiation and/or delays are therefore applied to the signals received at the input of block B, the said signals originating from different sensors of the vehicle via the CAN bus, to ensure that the signals at the output of block B will be in phase.

The sensors may be, for example, an inclination sensor, a clutch sensor, a sensor of the angular velocity of rotation of the engine, etc.

For that purpose, the device of the application uses FIR filters (for Finite Impulse Response, or finite response to impulses). When it receives an input signal arriving from a sensor, it introduces a delay into the said signal for the purpose of reducing the noise of the corresponding sensor, in a manner known in itself. The output signal y(t) of an FIR filter for an input signal x(t) is therefore:

$$y(t) = \sum_{i=1}^{N} a_i \cdot x(t - i \cdot T) \quad \text{EQUATION 6}$$

where
$a_i$ is the i-th coefficient of the FIR filter,
N is the total number of coefficients of the FIR filter,
x(t−i·T) is the input signal of the filter delayed by i·T seconds.

The device according to the invention may additionally be provided with filters for differentiation over m samples, which introduce a delay also known in itself (of the m/2 type).

For example, such filters may be constructed according to the following equation:

$$y(t) = \frac{\sum_{k=1}^{m} x(k) - x(k-m)}{m \cdot Ts} \quad \text{EQUATION 7}$$

where
Ts is the sampling time.

It is also possible to introduce constant delays in order to alleviate the delays due, for example, to filtering operations, to differentiation operations (especially in the course of the operation in which $\omega_m$ is differentiated in order to obtain $\dot{\omega}_m$) or to different sampling intervals on the CAN bus. The output signal y(t) is then expressed as having a constant delay relative to an input signal x(t) such that $$y(t) = x(t-T) \quad \text{EQUATION 8}$$

where
x(t−T) is the input signal delayed by T seconds.

Finally, variable delays may be introduced, these delays being linked to the characteristics of certain sensors.

For example, the engine speed sensor delivers an item of information on the speed of rotation of the engine in revolutions per minute: depending on the speed of rotation of the engine, the item of information is delivered more or less frequently, since it is obtained at the moment at which the engine executes a complete revolution. Thus the other signals, such as the estimate of the engine torque $C_{m\_CME}$, must be brought into phase with the instant of delivery of this engine signal $\omega_m$. The output signal y(t) is then expressed as having a variable delay relative to an input signal x(t) such that:

$$y(t) = \begin{cases} x(t) & \text{if } \omega_m^0 \leq \omega_m(t) < \omega_m^1 \\ x(t-T) & \text{if } \omega_m^1 \leq \omega_m(t) < \omega_m^2 \\ \ldots & \text{if } \ldots \\ x(t-(i-1) \cdot T) & \text{if } \omega_m^{i-1} \leq \omega_m(t) < \omega_m^i \\ x(t-i \cdot T) & \text{if } \omega_m(t) \geq \omega_m^i \end{cases} \quad \text{EQUATION 9}$$

where
$\omega_m^i$ is the i-th angular velocity threshold of the engine,
x(t−iT) is the input signal delayed by i·T seconds.

The use of these filters on the input signals therefore makes it possible to increase the robustness to noise of the sensors of the algorithm used by the device of the Application, by taking into account the delays due to the use of certain parameters during estimation of the clutch characteristic curve.

Improvement of Updating of the Clutch Characteristic Curve

In order to obtain the clutch characteristic curve, points $CC(\theta_{clutch\_CC}, ECT_{CC})$ relating the position $\theta_{clutch}$ of the clutch pedal and the maximal torque ECT that can be transmitted by the clutch are measured then recorded. The clutch characteristic curve is then discretized into $N_{intervals}$ intervals of torque ECT, as illustrated in the attached FIG. 3, each interval i ($1 \leq i \leq N_{intervals}$) being associated with a point $CC_i$ ($\theta_{clutch\_CC}(i), ECT_{CC}(i)$).

Preferably the intervals i ($1 \leq i \leq N_{intervals}$) are regular intervals, bounded by the torques $ECT_{Min}(i)$ and $ECT_{Max}(i)$ transmitted by the clutch, with $ECT_{Max}(i) = ECT_{Min}(i=1)$ (for $1 \leq N_{intervals} - 1$).

Figure 3:
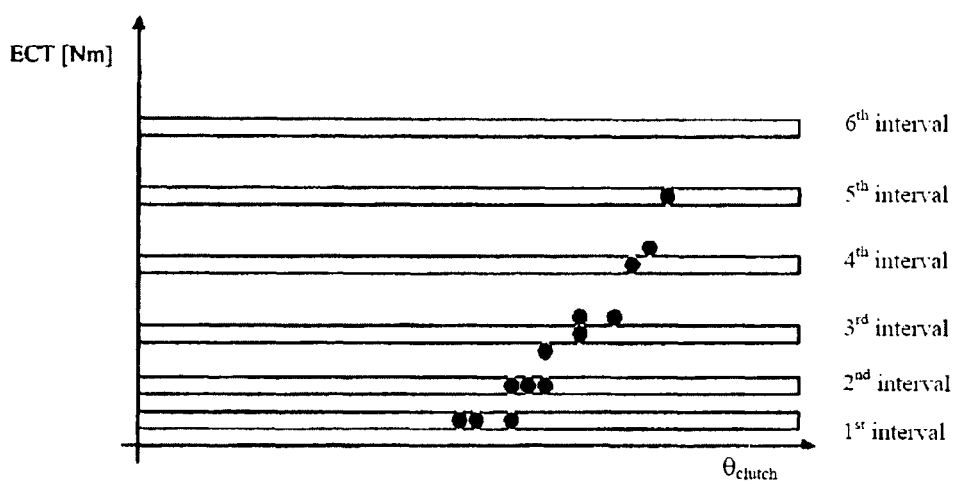
FIG. 3 presents a discretization of the clutch characteristic curve according to the invention.

Any other discretization may be envisioned, such as that represented in FIG. 3. Nevertheless, finer discretization is preferable for small values of ECT, to ensure that the clutch characteristic curve will be more precise around the bite point.

Preferably the signals taken into account for construction of the clutch characteristic curve are the signals obtained at the output of block B, namely signals filtered to make them robust to sensor noise and/or retarded to bring them into phase.

The algorithm and the method according to the invention comprise the following steps:

In the course of a first step, if a change of gear ratio is detected, a command to store points ($\tilde{\theta}_{clutch}$, $\tilde{ECT}$, $\tilde{\omega}_R$, $\tilde{\omega}_m$) in memory is generated, in order that the items of information about the clutch-pedal position $\theta_{clutch}$, the engine speed of rotation $\omega_m$, the speed of rotation of the wheels $\omega_R$ and the torque ECT transmitted by the clutch will be entered in memory in a recording means. During a return shift, a multitude of points ($\tilde{\theta}_{clutch}$, $\tilde{ECT}$, $\tilde{\omega}_R$, $\tilde{\omega}_m$) is captured in this way.

In the course of a second step, the method determines whether a gear ratio has been engaged and, if so, whether the gear change is a downshift. If this condition is not satisfied, the method does not take the captured points into account and rejects them. Otherwise it progresses to a third step, in the course of which it analyzes the captured points.

Of course, as we have seen hereinabove, the return-shift condition is a restriction chosen only to increase the robustness of the algorithm associated with the method. If the estimate of the engine torque is judged to be sufficiently reliable, this restriction may be canceled, in such a way that the points stored in memory during an upshift are also taken into account.

During the analysis of the captured points ($\tilde{\theta}_{clutch}$, $\tilde{ECT}$, $\tilde{\omega}_R$, $\tilde{\omega}_m$) in the course of the third step, the method establishes, for each point, whether it falls within an interval i of the clutch characteristic curve. If so, the point is then entered into memory. Otherwise the point is rejected.

Using the notation:
$\tilde{x}$ for the item of information captured for the variable x,
$\bar{x}$ for the mean calculated over the variable x,
$\tilde{P}_{i,j}$ ($\tilde{\theta}_{clutch}$ (i), $\tilde{ECT}$ (i)) for the j-th point captured in the course of a return shift to the i-th interval of the clutch characteristic curve,
the conditions that such a point ($\tilde{\theta}_{clutch}$, $\tilde{ECT}$, $\tilde{\omega}_R$, $\tilde{\omega}_m$) must satisfy to be entered into memory by the device are as follows:
the point must fall within the interval i: $ECT_{Min}(i) < \tilde{ECT} < ECT_{Max}(i)$
the slipping must be greater than a given threshold $\Delta\omega_{threshold}$: $\Delta\omega = \tilde{\omega}_R - \tilde{\omega}_m \cdot r(b) > \Delta\omega_{threshold}$
the deviation between the captured point and the point of the clutch characteristic curve to be updated in the interval i ($\theta_{clutch\_CC}(i)$ must be small, for example smaller than a threshold $\Delta\theta_{clutch}$: $|\tilde{\theta}_{clutch} - \theta_{clutch\_CC}(i)| < \Delta\theta_{clutch}$.

In the course of a fourth step, executed every $n_{re-clutch}$ return shifts, the acquired $n_i$ points of an interval i are averaged and entered into memory for each interval (in other words for i between 1 and $N_{intervals}$), in order to filter the errors due to modeling and to capture of the measurements:

$$\bar{P}_i = \frac{\sum_j \bar{P}_{ij}}{n_i}$$

where
$\bar{P}_i = \bar{P}_i(\bar{\theta}_{clutch}(i), \bar{ECT}(i))$ is the mean of the points captured in the i-th interval of the clutch characteristic curve.

Thus the clutch characteristic curve is itself determined following the capture and averaging of a set of points obtained in the course of a number $n_{re-clutch}$ of return shifts (or even in the course of a number $n_{re-clutch}$ of upshifts and/or downshifts).

The first three steps are executed in all return shifts (or even in all the upshifts and/or downshifts), while the fourth and fifth steps (see hereinafter) are executed only every $n_{re\_clutch}$ return shifts (or even every $n_{re\_clutch}$ upshifts or downshifts).

Furthermore, the number $n_{re-clutch}$ of return shifts taken into account as well as the error $\Delta\theta_{clutch}$ between the captured point $\tilde{\theta}_{clutch}$ and the point $\theta_{clutch}$ of the clutch characteristic curve may vary as a function of the reliability of the clutch characteristic curve. Thus, to increase the robustness of the algorithm and of the method according to the invention, these two parameters may be varied in the course of the life of the vehicle (and of its use).

For example, at the beginning of life of the vehicle, when the vehicle has experienced little use, when the clutch characteristic curve is less reliable, or in other words during the first return shifts executed on the vehicle or during the first kilometers traveled by the vehicle, the value of the number $n_{re-clutch}$ of return shifts taken into account in averaging and the value $\Delta\theta_{clutch}$ of the error threshold for a given interval i can be fixed at a high value, in such a way that all captured points are accepted and the error due to the measurements and to the modeling are finely filtered in the course of the method. Such parameterization therefore makes it possible to improve the initialization of the clutch characteristic curve appreciably.

Subsequently, in the course of use of the vehicle, the value attributed to these two parameters may then be reduced, since the clutch characteristic curve obtained and entered into memory according to the invention tends to converge toward the real clutch characteristic curve.

Finally, in the course of a fifth step, the method determines the update of the clutch characteristic curve, which preferably is carried out by means of a first-order low-pass filter, applied to each of the torque intervals ($1 \leq i \leq N_{intervals}$) every $n_{re-clutch}$ return shifts:

$$CC_i(k) = \alpha_{clutch\_curve} \cdot CC_i(k-1) + (1-\alpha_{clutch\_curve}) \cdot \bar{P}_i(k) \quad \text{EQUATION 10}$$

where
$\alpha_{clutch\_curve}$ is a reliability factor,
k indicates the calculation interval (every $n_{re-clutch}$ return shifts).
Thus $CC_i(k)$ is the point of the clutch characteristic curve in the torque interval i at the calculation interval k (or in other words after $k*n_{re-clutch}$ return shifts).
$CC_i(k-1)$ is the point of the clutch characteristic curve in the torque interval i at the calculation interval (k-1) (or in other words after $(k-1)*n_{re-clutch}$ return shifts).
$\bar{P}_i(k)$ is the mean of the points captured between the $k*n_{re-clutch}$ return shifts and the $(k-1)*n_{re-clutch}$ return shifts.

A value between 0 and 1 is attributed to the reliability coefficient $\alpha_{clutch\_curve}$ as a function of the reliability of the clutch characteristic curve.

Thus, for a reliable curve, the reliability coefficient $\alpha_{clutch\_curve}$ will be closer to 1 than for a poorly reliable clutch characteristic curve, for which the reliability coefficient will be close to zero.

This parameter $\alpha_{clutch\_curve}$ can itself be parameterized and, just as the value of the number $n_{re-clutch}$ of return shifts taken into account in averaging and the value $\Delta\theta_{clutch}$ of the error threshold, it may vary in the course of the vehicle life, in order that the curve obtained by the algorithm according to the invention will converge more rapidly toward the real clutch characteristic curve.

For example, during the first return shifts or during the first kilometers traveled by the vehicle, the value of $\alpha_{clutch\_curve}$ may be chosen to be low (close to zero) and then increased progressively as time passes. The weight of the most recently recorded point $CC_i(k-1)$ will therefore be less than that of the mean point $\overline{P}_i(k)$ for the value attributed to the point $CC_i(k)$.

In this way updating and learning of the clutch characteristic curve of the vehicle in real time throughout the entire life thereof is guaranteed.

The invention claimed is:

1. A power-assistance method for control by a computer of a vehicle provided with a motive power assembly connected to driving wheels by a clutch, comprising:
   - detecting, by the computer, a change of a gear ratio and, when the change of the gear ratio is detected, storing points related to a clutch pedal position, an engine speed of rotation, a speed of rotation of the wheels, and a torque transmitted by the clutch;
   - determining, by the computer, whether each of the stored points falls within one of a plurality of intervals of a clutch characteristic curve;
   - for each interval of the plurality of intervals, averaging, by the computer, the stored points determined to fall into the interval to determine an average value of the stored points and storing the average value in a memory;
   - determining, by the computer, a reliability coefficient that is a function of a reliability of the clutch characteristic curve, the reliability coefficient being a lower value at a start of use of the vehicle and increasing with use of the vehicle;
   - updating, by the computer, the clutch characteristic curve according to the following equation:

$$CC_i(k) = \alpha_{clutch\_curve} \cdot CC_i(k-1) + (1 - \alpha_{clutch\_curve}) \cdot P_i(k),$$

where $CC_i(k)$ is an updated value of a point of the clutch characteristic curve at the interval i at a calculation interval k, $\alpha_{clutch\_curve}$ is the reliability coefficient, $CC_i(k-1)$ is the current value of a point of the clutch characteristic curve at the interval i at a calculation interval k−1, and $P_i(k)$ is the average value of the stored points for the interval i, the clutch characteristic curve linking a position of a clutch pedal and a maximal torque that can be transmitted by the corresponding clutch;
   - determining, by the computer, a torque transmitted by the clutch according to the updated clutch characteristic curve; and
   - releasing, by the computer, a brake of the vehicle when the torque transmitted by the clutch exceeds a torque required for the vehicle to pull away.

2. A power-assistance method according to claim 1, wherein the clutch characteristic curve is updated in real time throughout a life of the vehicle.

3. A power-assistance method according to claim 1, employing a power-assistance device.

4. A power-assistance method according to claim 1, wherein the determining whether each of the stored points falls within one of a plurality of intervals of a clutch characteristic curve includes rejecting the stored points that are not determined to fall within one of the intervals.

5. A power-assistance method according to claim 1, wherein the detecting includes rejecting the stored points when the gear change is not a downshift.

6. A power-assistance method according to claim 1, wherein the reliability coefficient increases from 0 to 1 with the use of the vehicle.

* * * * *